United States Patent [19]

Neff et al.

[11] Patent Number: 5,882,525
[45] Date of Patent: Mar. 16, 1999

[54] METHOD FOR TREATING SUSPENDED SOLIDS

[75] Inventors: Roger Edgar Neff; Joseph Jacinto Pellon, both of Stamford; Roderick Glyn Ryles, Milford, all of Conn.

[73] Assignee: Cytec Technology Corp., Wilmington, Del.

[21] Appl. No.: 957,108

[22] Filed: Oct. 24, 1997

Related U.S. Application Data

[63] Continuation of Ser. No. 28,001, Mar. 8, 1993, abandoned, which is a continuation of Ser. No. 51,228, Jul. 9, 1990, abandoned, which is a division of Ser. No. 285,933, Dec. 19, 1988, abandoned.

[51] Int. Cl.$^6$ ................................................... B01D 21/01
[52] U.S. Cl. ........................................... 210/735; 210/734
[58] Field of Search ................................. 210/732, 734, 210/738, 735

[56] References Cited

U.S. PATENT DOCUMENTS

| | | | |
|---|---|---|---|
| 3,968,037 | 7/1976 | Morgan et al. | 210/47 |
| 4,421,902 | 12/1983 | Chang et al. | 526/317 |
| 4,459,396 | 7/1984 | Yamasaki et al. | 526/200 |
| 4,525,527 | 6/1985 | Takeda | 524/831 |
| 4,720,346 | 1/1988 | Flesher | 210/734 |

FOREIGN PATENT DOCUMENTS

| | | | |
|---|---|---|---|
| 2589145 | 10/1985 | France | C02F 11/14 |
| HEI 1-203251 | 2/1988 | Japan | C04B 24/26 |
| 8510496 | 4/1985 | United Kingdom . | |

*Primary Examiner*—Christopher Henderson
*Attorney, Agent, or Firm*—Frank M. Van Riet; Joseph J. Mallon

[57] ABSTRACT

Water-soluble, branched, high molecular weight, cationic and non-ionic polymeric flocculants capable of manifesting their full performance potential without shearing are produced by polymerizing ethylenically unsaturated cationic and non-ionic monomers and a branching agent in the presence of a chain-transfer agent. They are useful as flocculating agents for releasing water from dispersions of suspended solids.

10 Claims, No Drawings

METHOD FOR TREATING SUSPENDED SOLIDS

This is a continuation of U.S. application Ser. No. 08/028,001, filed Mar. 8, 1993 and now abandoned, which in turn is a continuation of U.S. application Ser. No. 07/551,228, filed Jul. 9, 1990 and now abandoned, which in turn is a divisional of U.S. application Ser. No. 07/285,953, filed Dec. 19, 1988 and now abandoned.

The present invention relates to unsheared, high molecular weight, highly branched, water-soluble, polymers and, more particularly, to a method of preparing such polymer compositions, and their use as flocculating agents.

BACKGROUND OF THE INVENTION

Flocculation is a form of liquid-solid phase separation which facilitates the removal of finely divided particles from a liquid by enhancing agglomeration of suspended particles in order to increase particle size, and is often applied to enable conformity with effluent clarity requirements. Flocculation may be accomplished by chemical means, e.g., addition of a flocculating agent.

Synthetic, organic, polymeric, flocculating agents have been utilized in industry since the 1950's. It has been observed, by those skilled in the art, that high molecular weight polymers are particularly useful as chemical flocculating agents, provided that the polymers are water-soluble. Many such water-soluble, high molecular weight, polymeric, flocculating agents are known to those skilled in this art.

Linear, water-soluble polymers have been used as flocculating agents in the treatment of waste sludges with some degree of success. However, due to modern concerns with environmental protection, sludge incineration and transportation costs, it has become increasingly desirable to improve on the performance of conventional, linear flocculants by providing a flocculating agent which causes the formation of higher cake solids.

The present invention provides a method for preparing a novel, highly branched, high molecular weight water-soluble, polymeric flocculant using a polyfunctional monomer such as methylenebisacrylamide, polyethyleneglycol dimethacrylate, n-vinyl acrylamide and the like, as a branching agent. The prior art discloses several attempts to produce high molecular weight, branched, water-soluble polymers. Zweigle, U.S. Pat. No. 4,059,522 discloses the use of branching agents to yield a totally crosslinked system, but flocculants prepared in this manner are insoluble in water and thus ineffective. Morgan, et al., U.S. Pat. No. 3,698,037 discloses branched, cationic homopolymers obtained through incorporation of a multifunctional branching agent in the absence of a molecular weight controlling or chain-transfer agent. It is well known to those skilled in the art, that the molecular weight of such cationic homopolymers is limited, whereas much higher molecular weight polymers may be obtained by copolymerizing cationic monomers with acrylamides. The above discussed patent makes no mention of molecular weight specifics.

Pech, Fr. 2,589,145 discloses a branched copolymer prepared using solution polymerization techniques in the presence of a high activity chain-transfer agent. However, the polymers disclosed in this patent have molecular weights below 1 million with solution viscosities of 2200 to 3600 mPa•s at 20 percent polymer concentrations, thus showing these polymers to be truly low molecular weight copolymers. The lowest molecular weight polymer of the present invention is much higher, greater than 1 million, and has a solution viscosity of 5,570 mPa•s at only 2.32 percent polymer concentration. (See Example 36C).

Other patent disclosures use shearing of crosslinked polymer chains to obtain desired water-solubility. Whittaker, U.S. Pat. No. 4,705,640 discloses the shearing of crosslinked polymer gels which are insoluble in water to physically degrade them to such an extent that they become water-soluble. The preferred method of degradation is mechanical with a high degree of chopping type action, such as subjecting dilute solutions of polymer to rotating blades at up to 20,000 rpm. Degradation is claimed to improve flocculation performance by increasing the effective ionicity of the polymer. The increase in effective ionicity is quantified by measuring the ionic regain (IR); IR=(IAD-IBD)/IAD×100 where IAD is the ionicity after degradation and IBD is the ionicity before degradation. The ionicity can be measured by a colloid titration technique as described therein and also Flesher et al, U.S. Pat. No. 4,720,346, which discloses a process for flocculating aqueous suspensions of solids by the use of a polymeric material in the form of small particles rather than a true solution. Flesher et al also disclose the need to shear crosslinked polymer materials, such that the polymer has an ionic regain value of 15 to 70 percent, since polymers having too low an IR value give an inadequate benefit. Flesher et al define shear as that which is applied as an analytical technique to impart properties on polymers, such as IR, so that the polymers may be used in that invention. In Column 11, lines 3–10, Flesher et al further disclose that higher flocculant dose levels are needed to achieve optimum floc stability, sometimes 20 percent more than dose requirements of conventional, water-soluble linear polymers.

Flesher indicates that branched copolymers can be prepared by using chain-transfer agents, such as isopropanol and mercaptoethanol, in conjunction with cross-linking agents. However, no examples are provided, and it appears quite unlikely that Flesher discovered compositions corresponding to those claimed herein which outperform the Flesher materials and are simpler to use.

Farrar, in U.S. Pat. No. 4,759,856, also describes, in Column 6, lines 1–6, the need to apply shear to convert crosslinked polymers that would normally have been rejected or that would have been expected to have given poor flocculation properties to a form in which it will give very good flocculation properties. The patentee teaches shearing in such a manner that the polymer undergoes an ionic regain of at least 15 percent, preferably at least 30 percent, and usually at least 50 percent, as a result of the shearing, to effect a conversion to a useful polymer flocculant.

Surprisingly, it has now been discovered that high molecular weight, highly branched, water-soluble, polymeric flocculants can be produced without the use of high level shear and independent of ionic regain values. Polymeric flocculants produced by the practice of the present invention are subjected only to minimal levels of shear, sufficient only to cause solubilization with little or no physical degradation of the polymer. Furthermore, the polymeric flocculants of the present invention encompass IR values ranging from about 0 to about 70 percent, and improved performance of these polymers is not enhanced by increase in effective ionicity, but instead they perform as well at ionicity levels within the scope of the prior art as well as without. Polymeric flocculants of the present invention outperform the flocculants of the prior art, consistently producing high levels of cake solids often at lower dose levels. Additionally, polymeric flocculants of this invention and their mixtures are more convenient and less costly to use than prior art flocculants which require the end user to employ high shear equipment prior to use, in order to gain the desired optimum flocculation effect, thus increasing both the time and cost of the operation.

The present invention enables the preparation of truly water-soluble, highly branched, high molecular weight, polymers particularly useful as chemical flocculating agents. The polymers of this invention are prepared using a branching agent in the presence of a chain-transfer agent to produce a product which is highly branched and water-soluble. Additionally, the polymers of this invention do not require the application of controlled shear to attain optimum performance, thereby saving additional costs. The present invention has particularly been found useful when applied to branched copolymers comprising acrylamide and at least one ethylenically unsaturated cationic, or non-ionic monomer.

SUMMARY OF THE INVENTION

According to the present invention, there are provided unsheared, cationic, water-soluble, branched, polymeric flocculants, said polymeric flocculants having a solution viscosity of at least 1.8 mPa•s measured in a Brookfield viscometer with a UL adapter at 25° C. on a 0.1 percent, by weight, polymer solution in 1M NaCl at 60 rpm, a solubility quotient of greater than about 30 percent, and a branching agent content of from about 4 to about 80 molar parts per million based on initial monomer content. Preferably, the polymeric flocculants possess a solubility quotient of greater than about 40 percent, the branching agent comprises from about 8 to about 20 molar parts per million based on original monomer content and exhibit a solution viscosity of at least about 2.4 mPa•s measured in a Brookfield viscometer with a UL adapter at 25° C. on a 0.1 percent, by weight, polymer solution in 1M NaCl at 60 rpm. For purposes of this invention, the term "unsheared," when used herein and in the appended claims, does not exclude normal mixing which is used to disperse polymers. For example, mixing with a magnetic stirrer, as will be described hereinafter, will not produce a "sheared" polymer but the polymer will be "unsheared" within the meaning of the claims even after 2 hours of mixing.

Also, according to the present invention there is provided a process for the preparation of an unsheared, water-soluble, branched, polymeric, cationic flocculant, as above defined, said process comprising polymerizing one or more cationic, ethylenically unsaturated monomers with at least one branching agent in an amount from about 4 to about 80 molar parts per million based on initial monomer content, in the presence of at least one chain-transfer agent in an amount at least sufficient to provide said polymeric flocculant with a solubility quotient of greater than about 30 percent.

Preferably, such a process calls for the addition of from about 8 to about 20 molar parts per million, based on original monomer content, of branching agent, wherein the branched polymeric flocculant has a solubility quotient of greater than about 40 percent and has a solution viscosity of at least about 2.4 mPa•s measured in a Brookfield viscometer with a UL adapter at 25° C. on a 0.1 percent, by weight, polymer solution in 1M NaCl at 60 rpm.

According to the present invention there are also provided non-ionic, water-soluble, highly branched, polymeric flocculants comprising one or more ethylenically unsaturated, non-ionic monomers, said polymeric flocculants having a solution viscosity of at least about 1.9 mPa•s, preferably at least about 2.4 mPa•s, measured in a Brookfield viscometer with a UL adapter at 25° C. on a 0.1 percent, by weight, polymer solution in 1M NaCl at 60 rpm, a branching agent content of from about 4 to about 80 molar parts per million based on initial monomer content, and a process for the preparation of the polymeric flocculant therein.

Furthermore, according to the present invention, there are provided methods of flocculating dispersions of suspended solids, such as sewage sludge, which comprise (a) adding to the dispersion from about 0.1 to about 50,000 parts per million of an unsheared, water-soluble, branched, polymeric, cationic or non-ionic flocculant, as above defined above, and (b) dewatering the dispersion of suspended solids and polymeric flocculant.

DETAILED DESCRIPTION OF THE INVENTION

High molecular weight, unsheared, highly branched, water-soluble, polymeric flocculants are formed by the polymerization of cationic and/or nonionic ethylenically unsaturated monomers, alone or with comonomers, and in the presence of a branching agent and a chain-transfer agent in optimum proportions.

Cationic monomers useful in the practice of this invention include diallyldimethylammonium chloride; acryloxyethyltrimethylammonium chloride; (meth)acrylates of N,N-dialkylaminoalkyl compounds; and quaternaries and salts thereof, such as N,N-dimethylaminoethylacrylate methylchloride salt; monomers of N,N-dialkylaminoalkyl (meth) acrylamides; and salts and quaternaries thereof, such as N,N-dialkylaminoethylacrylamides; methacrylamidopropyltrimethylammonium chloride; 1-methacryloyl-4-methyl piperazine and the like. Cationic monomers are generally of the following formulae;

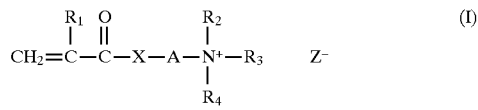

where $R_1$ is hydrogen or methyl, $R_2$ is hydrogen or lower alkyl of $C_1$ to $C_4$, $R_3$ and/or $R_4$ are hydrogen, alkyl of $C_1$ to $C_{12}$, aryl or hydroxyethyl and $R_2$ and $R_3$ or $R_2$ and R4 can combine to form a cyclic ring containing one or more hetero atoms, and Z is the conjugate base of an acid, X is oxygen or —$NR_1$— wherein $R_1$ is as defined above, and A is an alkylene group of $C_1$ to $C_{12}$; or

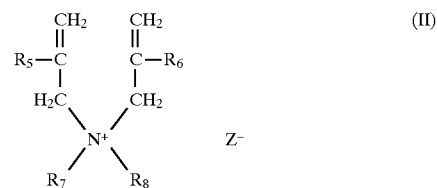

where $R_5$ and $R_6$ are hydrogen or methyl, $R_7$ is hydrogen, alkyl of $C_1$ to $C_{12}$ or benzyl, and $R_8$ is hydrogen, alkyl of $C_1$ to $C_{12}$ benzyl or hydroxyethyl; and Z is as defined above.

Nonionic monomers, suitable in the practice of this invention, generally comprise acrylamide; methacrylamide; N-alkylacrylamides, such as N-methylacryl-amide; N,N-dialkylacrylamides, such as N,N-dimethylacrylamide; methyl acrylate; methyl methacrylate; acrylonitrile; N-vinylmethylacetamide or formamide; N-vinyl acetate or vinyl pyrrolidone, and the like.

These ethylenically unsaturated monomers may be copolymerized to produce cationic or nonionic copolymers.

Preferably, a nonionic monomer, such as an acrylamide is copolymerized with a cationic comonomer to produce a cationic copolymer. Cationic copolymers useful in the practice of this invention, comprise from about 1 to about 99 parts, by weight, of an acrylamide monomer and from about 99 to about 1 part, by weight, of a cationic comonomer. Preferably, the copolymer comprises from about 10 to about 99 parts, by weight, of an acrylamide monomer and from about 90 to about 1.0 part, by weight, of a cationic comonomer.

Polymerization of the monomers is conducted in the presence of a polyfunctional branching agent to form the branched homopolymer or copolymer. The polyfunctional branching agent comprises compounds having either at least two double bonds, a double bond and a reactive group or two reactive groups. Polyfunctional branching agents should have at least some water-solubility. Illustrative of those compounds containing at least two double bonds are methylenebisacrylamide; methylenebismethacrylamide; polyethyleneglycol diacrylate; polyethyleneglycol dimethacrylate; N-vinyl acrylamide; divinylbenzene; triallylammonium salts; N-methylallylacrylamide; and the like. Polyfunctional branching agents containing at least one double bond and at least one reactive group include glycidyl acrylate; acrolein; methylolacrylamide; and the like. Polyfunctional branching agents containing at least two reactive groups include aldehydes, such as glyoxal; diepoxy compounds and epichlorohydrin and the like.

Branching agents should be used in sufficient quantities to assure a highly branched copolymer product. Preferably, a branching agent content of from about 4 to about 80 molar parts per million, based on initial monomer content, is added to induce sufficient branching of the polymer chain.

Essential to the practice of this invention is the addition of, in optimum concentration, a molecular weight modifying or chain-transfer agent to control the structure and solubility of the polymer. In the absence of a chain-transfer agent, the incorporation of even extremely small amounts of branching agent, e.g. 5 parts per million may cause crosslinking, rendering the polymer insoluble in water. However, soluble, highly branched, copolymer products are obtained in accordance with the present invention when a chain-transfer agent is used, in optimum concentration, in conjunction with said branching agent. Many such chain-transfer agents are well known to those skilled in the art. These include alcohols; mercaptans; thioacids; phosphites and sulfites, such as isopropyl alcohol and sodium hypophosphite, although many different chain-transfer agents may be employed.

It is extremely important that optimum concentrations of chain-transfer agent be employed in order to produce a highly branched, water-soluble product. Addition of too little chain-transfer agent produces a non-soluble copolymer product and the addition of too much chain-transfer agent produces a product with too low a solution viscosity, i.e. molecular weight.

The optimum concentration of chain-transfer agent, can be determined by measuring the solubility quotient. For purposes of this invention, solubility quotient is defined as the total mole % cationicity in the polymer as determined by an anion binding technique (CEQ), e.g. colloid titration, divided by the total cationicity as determined by an analytical technique which does not depend on anion binding, using, e.g., nuclear magnetic resonance, infra red spectroscopy or chemical analysis, the quotient of which is multiplied by 100. The cationicity is determined by measuring the CEQ as described in Volume 62, Number 7 of the Journal of Chemical Education dated July 1985 at pages 627 to 629, which comprises measuring the cationicity of a solution using colloid titration to determine the solubility in water. Use of a chain-transfer agent in concentrations such that the solubility quotient is less than 30 percent provides products that are not soluble. Only when optimum concentrations are used, effectuating a solubility quotient greater than 30 percent, do the polymers exhibit the required solubility characteristics. Thus, the soluble polymers of this invention all possess a minimum solubility quotient of over 30 percent, preferably over 40 percent and even more preferably over 50 percent. Many exhibit a solubility quotient of greater than 90 percent.

In the case of nonionic polymers, chain-transfer agent is added in an amount sufficient to provide the polymer with a solution viscosity of at least about 1.9 mPa•s measured in a Brookfield viscometer with UL adapter at 25° C. on a 0.1 percent solution, by weight, polymer solution in 1M NaCl at 60 rpm and thus achieve requisite solubility.

Actual polymerization may be carried out using gel or emulsion (suspension) polymerization techniques. These techniques are widely known to those skilled in the art.

Emulsion polymerization procedures involve the preparation of two phases. The aqueous phase comprises the monomer(s), branching agent and chain-transfer agent dissolved in deionized water, and other additives well known to those skilled in this art, such as stabilizers and pH adjusters. The oil phase comprises a water-insoluble hydrocarbon solution of surfactant(s). The aqueous phase and oil phase are then mixed and homogenized in a conventional apparatus until particle size is in the 1.0 micron range and a suitable bulk viscosity is obtained. The emulsion is then transferred to a suitable flask wherein the emulsion is agitated and sparged with nitrogen for about thirty minutes. A polymerization initiator, such as sodium metabisulfite solution, is then continuously added to the solution to begin polymerization. Polymerization is allowed to exotherm to the desired temperature which is maintained by cooling until cooling is no longer required. Finished emulsion product is cooled to 25° C.

In a typical gel polymerization procedure, monomer(s), branching agent and chain-transfer agent are dissolved in deionized water and the pH is adjusted as desired. The solution is placed in a polymerization vessel and sparged with nitrogen with the temperature of the solution being adjusted to about 6.0° C. An initiator is then added, and the polymerization is allowed to exotherm to maximum temperature. Once maximum temperature is attained, the media is placed in an oven at about 70° C. for about 8 hours. The resulting gel is reduced to gel worms, air dried and reduced to powder.

Any conventional additives may be used to stabilize the aqueous phase and oil phase solution. Suitable additives include ammonium sulfate; ethylenediaminetetraacetic acid (disodium salt) and diethylene triaminepentaacetate (pentasodium salt). See Modern Plastics Encyclopedia/88, McGraw Hill, October 1987, pp. 147–8.

Any known initiator may be employed to initiate polymerization. Suitable for use in this invention are azobisisobutyronitrile; sodium sulfite; sodium metabisulfite; 2,2'-azobis(2-methyl-2-amidino-propane) dihydrochloride; ammonium persulfate and ferrous ammonium sulfate hexahydrate, and the like. organic peroxides may also be employed for polymerizing ethylenically unsaturated monomers. Particularly useful for the purpose of this invention is t-butyl hydroperoxide. See Modern Plastics Encyclopedia/88, McGraw Hill, October 1987, pp. 165–8.

The product so prepared is an unsheared, high molecular weight, highly branched, water-soluble, cationic or nonionic polymer specially suited for use as a chemical flocculating agent without requiring the use of controlled shear to attain optimum performance.

The flocculation and dewatering stages of this invention, to release water from a dispersion of suspended solids, are carried out by adding the unsheared, highly branched, high molecular weight, water-soluble, cationic or non-ionic polymeric flocculant in solution to the suspension and then using a conventional dewatering apparatus to remove water from the suspension, producing a crystal clear effluent.

The products of this invention are useful in facilitating a wide range of solid-liquid separation operations. The polymeric flocculants may be used to dewater suspended solids and other industrial sludges, for the drainage of cellulosic suspensions such as those found in paper production and for the settlement of various inorganic suspensions.

DESCRIPTION OF THE PREFERRED EMBODIMENTS

The following examples illustrate the present invention. They are not to be construed to limit the claims in any manner whatsoever.

EXAMPLES 1 TO 9

A cationic acrylamide polymer is prepared by emulsion polymerization. The aqueous phase is made by dissolving 87.0 gms of commercial, crystal acrylamide monomer, 210.7 gms of 75% acryloxyethyltrimethylammonium chloride, 4.1 gms of ammonium sulfate, 4.9 gms of 5% ethylenediaminetetraacetic acid (disodium salt), 3.68 gms of 1.5% 2-propanol, as chain-transfer agent, 1.0 gm. of 0.245t (10 ppm) methylenebisacrylamide, as branching agent (Example 5B), and 2.56 gms t-butyl hydroperoxide, as a polymerization initiator, into 189.3 gms of deionized water. The pH is adjusted to 3.5 (+0.1) by adding sulfuric acid.

The oil phase is prepared by dissolving 12.0 gms of sorbitan monooleate into 173.4 gms of low odor paraffin oil.

The aqueous phase and oil phase are mixed together and homogenized until the particle size is in the 1.0 micron range.

The emulsion is then transferred to a one liter, three-necked, creased flask equipped with an agitator, nitrogen sparge tube, sodium metabisulfite activator feed line and thermometer.

The emulsion is then agitated, sparged with nitrogen and the temperature adjusted to 25° C. (±1° C.). After sparging for 30 minutes, 0.8% sodium metabisulfite (MBS) solution is added at a rate of 0.028 ml/min. The polymerization is allowed to exotherm and the temperature is controlled with ice water. When cooling is no longer necessary to maintain the required temperature, the 0.8% MBS solution addition rate is increased and a heating mantel applied to maintain the temperature. The total polymerization time takes approximately 4 to 5 hours. The finished emulsion product is then cooled to 25° C. The experiment is repeated varying the amounts of isopropyl alcohol (IPA) and methylene bisacrylamide (MBA) in proportion to base monomer. The solution viscosity and the solubility quotient are determined and set forth in the Table 1, below. Solution viscosity and solubility quotient (CEQ %) are determined by preparing aqueous emulsion solutions. A 0.2% aqueous solution of the emulsion product is prepared by dispersing 1.70 grams of 34% emulsion product into a one liter beaker containing 298 grams of deionized water and 0.2 gram of breaker surfactant. The dispersion is agitated at 250 rpm for 2 hours on a magnetic stirrer with a 6 cm long by 1 cm diameter magnetic stirring bar. The solution is then further diluted to 0.1% for solution viscosity and unsheared CEQ determinations.

A 0.1%.sheared solution is also prepared for comparison purposes. Unsheared 0.1% solution, prepared from the 0.2% solution, as defined above, is transferred into a 30 oz. Waring blender glass jar having an inside diameter of about 7 cm and four rotatable blades that are about 4 cm in diameter, 2 blades pointing upward at about 30° angles and two blades pointing downward at 30° angles. The blades are 1 mm thick and are rotated at about 12,100 rpm for two hours. The solution temperature is kept at or below 25° C. during this two hour shearing period.

Solution viscosity is determined by adding 5.84 gms of sodium chloride to 100 grams of 0.1% sheared or unsheared polymer solution and stirring slowly for 15 minutes. The viscosity is then determined by using a Model LVT Brookfield viscometer with UL adapter at 60 rpm, at 25° C. (±0.1° C.).

Solubility quotient (CEQ %) is determined by measuring solution cationicity using colloid titration in accordance with the above-mentioned CEQ technique as described in Vol. 62, No. 7, Journal of Chem. Ed., July 1985, pp. 627–629. The compositions used and the results obtained are set forth in Table 1.

TABLE 1

SOLUBILITY AND SOLUTION VISCOSITY OF CATIONIC ACRYLAMIDE/Q-9 COPOLYMERS

| EXAMPLES | Q-9 Mole % | IPA % | MBA wppm | MBA mppm | S.V. mPa·s | CEQ % | CEQ(S) % | IR % |
|---|---|---|---|---|---|---|---|---|
| 1A* | 40 | 0 | 5 | 3.9 | 1.81 | 18.0 | 76.8 | 76.6 |
| 1B* | 40 | 0 | 10 | 7.8 | 1.71 | 16.0 | 66.0 | 75.8 |
| 1C* | 40 | 0 | 20 | 15.6 | 1.55 | 16.2 | 69.0 | 76.5 |
| 1D* | 40 | 0 | 30 | 23.4 | 1.39 | 11.8 | 42.9 | 72.5 |
| 1E* | 40 | 0 | 50 | 39.0 | 1.41 | 6.5 | 25.6 | 97.0 |
| 1F* | 40 | 0 | 100 | 78.0 | 1.26 | 4.1 | 12.6 | 67.5 |
| 2A* | 40 | 0.125 | 20 | 15.6 | 1.49 | 13.7 | 56.1 | 75.6 |
| 2B* | 40 | 0.25 | 20 | 15.6 | 1.78 | 29.5 | 96.9 | 69.6 |
| 3A* | 40 | 0.5 | 0 | 0 | 3.67 | 85.6 | 94.3 | 9.2 |
| 3A | 40 | 0.5 | 5 | 3.9 | 3.98 | 79.9 | 98.5 | 18.9 |
| 3B | 40 | 0.5 | 10 | 7.8 | 3.53 | 66.4 | 97.0 | 31.5 |
| 3C | 40 | 0.5 | 15 | 11.7 | 2.75 | 54.6 | 92.2 | 40.8 |
| 3D | 40 | 0.5 | 25 | 19.5 | 1.80 | 30.6 | 93.7 | 67.3 |
| 4A* | 40 | 1.0 | 0 | 0 | 2.94 | 90.0 | 93.7 | 3.9 |
| 4A | 40 | 1.0 | 5 | 3.9 | 3.19 | 84.1 | 92.5 | 8.4 |
| 4B | 40 | 1.0 | 10 | 7.8 | 3.34 | 87.1 | 94.0 | 7.3 |
| 4C | 40 | 1.0 | 15 | 11.7 | 2.71 | 53.7 | 95.2 | 4.4 |
| 4D | 40 | 1.0 | 25 | 19.5 | 1.92 | 31.5 | 94.0 | 62.5 |
| 4B* | 40 | 1.0 | 50 | 39.0 | 1.48 | 16.3 | 76.5 | 78.7 |
| 5A* | 40 | 1.5 | 0 | 0 | 2.12 | 95.8 | 97.0 | 1.2 |
| 5A | 40 | 1.5 | 5 | 3.9 | 2.76 | 93.4 | 94.6 | 1.3 |
| 5B | 40 | 1.5 | 10 | 7.8 | 2.74 | 91.6 | 95.2 | 3.8 |
| 5C | 40 | 1.5 | 20 | 15.6 | 3.01 | 92.8 | 94.3 | 1.6 |
| 5B* | 40 | 1.5 | 50 | 39.0 | 1.74 | 27.0 | 90.4 | 70.1 |
| 5C* | 40 | 1.5 | 100 | 78.0 | 1.46 | 14.1 | 72.9 | 80.7 |
| 6A* | 40 | 2.0 | 0 | 0 | 2.24 | 97.5 | 98.8 | 1.3 |
| 6A | 40 | 2.0 | 5 | 3.9 | 2.36 | 97.6 | 97.6 | 0 |
| 6B | 40 | 2.0 | 10 | 7.8 | 2.45 | 92.8 | 94.3 | 1.6 |
| 6C | 40 | 2.0 | 15 | 11.7 | 2.44 | 96.4 | 97.3 | 0.9 |
| 6D | 40 | 2.0 | 25 | 19.5 | 2.50 | 97.6 | 97.6 | 0 |
| 6E | 40 | 2.0 | 50 | 39.0 | 2.81 | 92.8 | 94.3 | 1.6 |
| 7A | 40 | 4.0 | 25 | 19.5 | 1.90 | 96.9 | 97.6 | 0.7 |
| 7B | 40 | 4.0 | 50 | 39.0 | 2.18 | 92.7 | 94.6 | 2.0 |
| 7C | 40 | 4.0 | 100 | 78.0 | 1.92 | 54.0 | 95.5 | 43.5 |
| 8A* | 20 | 0 | 10 | 6.2 | 2.01 | 21.4 | 73.8 | 71.0 |
| 8B* | 20 | 0 | 25 | 15.5 | 1.43 | 10.3 | 37.3 | 72.4 |
| 8A | 20 | 1.5 | 10 | 6.2 | 2.69 | 79.8 | 83.2 | 4.1 |
| 8B | 20 | 1.5 | 25 | 15.5 | 3.20 | 65.0 | 80.6 | 19.4 |
| 9A* | 60 | 0 | 10 | 9.4 | 1.69 | 15.5 | 79.1 | 80.4 |
| 9B* | 60 | 0 | 25 | 23.5 | 2.46 | 8.8 | 62.2 | 85.9 |

TABLE 1-continued

SOLUBILITY AND SOLUTION VISCOSITY
OF CATIONIC ACRYLAMIDE/Q-9 COPOLYMERS

| EX-AM-PLES | Q-9 Mole % | IPA % | MBA wppm | MBA mppm | S.V. mPa·s | CEQ % | CEQ(S) % | IR % |
|---|---|---|---|---|---|---|---|---|
| 9A | 60 | 1.5 | 10 | 9.4 | 2.49 | 83.5 | 88.3 | 5.4 |
| 9B | 60 | 1.5 | 25 | 23.5 | 2.46 | 82.7 | 85.3 | 3.0 |

\* = Control Sample
(S) = sheared polymer solution
Q-9 = acryloxyethyltrimethylammonium chloride
IPA = isopropyl alcohol, chain-transfer agent
MBA = methylenebisacrylamide, branching agent
S.V. = solution viscosity
IR = [CEQ(S)-CEQ]/CEQ(S)
wppm = weight parts per million
mppm = molar parts per million Table 1 demonstrates the huge, beneficial effect of adding chain-transfer agent on the solubility and solution viscosity properties of branched cationic copolymers of acrylamide prepared by incorporating a difunctional monomer into the polymer chain. The observable cationicity, CEQ, is a direct measure of the solubility of the copolymer. Soluble copolymers possess a solubility quotient of greater than 30 percent, and those below 30 percent are deemed insoluble. The solution viscosity is a measure of molecular weight of the copolymer and shows all soluble copolymers to possess very high molecular weights, greater than 1 million.

As can be readily seen from Example 1, the incorporation of even extremely small amounts, 5 wppm, of branching agent causes insolubilization of the copolymer in the absence of any chain-transfer agent. However, soluble, highly branched products with high molecular weight are readily obtainable by the addition of chain-transfer agent, IPA, in optimum concentrations.

Examples 2A and 2B indicate that polymers falling outside the scope of those claimed in the present invention are produced following the art recognized usage of low quantities of chain-transfer agent.

It can be noted that applying shear to the polymer solution does not significantly affect the solubility of polymers with optimum concentrations of chain-transfer agent, e.g., Samples 4A, 4B, 5A, 5B, 5C, 6A, 6B, 6C, 6D, 6E, 7A, 7B, 8A, 9A and 9B. However, the CEQ(S) data in Table 1 do correspond with allegations in the prior art, that shearing can render insoluble polymers soluble, as discussed above. Note that, in Table 1, IR=(CEQ(S)-CEQ)/CEQ(S), and is a measure of ionic regain. Polymers exhibiting a high IR value are not necessarily insoluble as claimed in the prior art, and thus IR is not a measure of solubility. IR is simply a measure of cationicity which is recovered in a shearing process. Polymers produced in accordance with this invention possess a wide range of IR values and solubility is not a function of the IR value. Polymers such as 6A and 6E have an IR value of 0 and a solubility quotient of 97.6 percent.

EXPERIMENTS 10–11

Branched copolymers are prepared in the same manner as in Example 1 except that polyethyleneglycol (MW=600) dimethacrylate (PEGDMA) is substituted as the branching agent for MBA. Solution viscosity and solubility of sheared and unsheared copolymers are determined and set forth in Table 2, below.

TABLE 2

SOLUTION VISCOSITY AND SOLUBILITY OF 40:60
Q9-AMD COPOLYMERS PREPARED WITH PEGDMA

| Example | IPA % | PEGDMA wppm | PEGDMA mppm | S.V. mPa·s | CEQ % | CEQ(S) % | IR % |
|---|---|---|---|---|---|---|---|
| 10 | 1.5 | 49.4 | 7.8 | 2.93 | 76.5 | 89.5 | 14.5 |
| 11 | 1.5 | 123.4 | 19.5 | 1.88 | 45.0 | 90.4 | 50.2 |

AMD = acrylamide
SEE LEGEND OF TABLE 1

As shown in Table 2, above, unsheared, soluble, highly branched, high molecular weight polymers in accordance with this invention can be prepared with alternative branching agents.

EXAMPLE 12

A cationic acrylamide copolymer is prepared by gel (dry powder) polymerization. 89.98 gms of acrylamide, 218.20 gms of 75% acryloxyethyltrimethylammonium chloride, 0.2 gm of 10% diethylenetriaminepentaacetate (pentasodium salt), 15.0 gms adipic acid, 1.1 mls. of 20% sulfuric acid, 2.54 gms 1% sodium hypophosphite (100 ppm on monomer), 1.0 gm of 0.254% methylenebisacrylamide are dissolved in 412.33 gms deionized water. The monomer make-up solution is placed in a one quart polymerization vessel equipped with a nitrogen sparge tube, thermometer and activator addition ports. The solution is sparged with nitrogen gas for 30 minutes. During sparging, the solution temperature is adjusted to 6.0° C. (±1° C.). After sparging, 10 ml of 2% 2,2-azobis(2-methyl-2-amidinopropane) dihydrochloride, 0.8 ml of 0.25% ammonium persulfate and 0.8 ml 0.25% ferrous ammonium sulfate hexahydrate polymerization activators are added. As soon as the monomer make-up thickens, the nitrogen sparge tube is raised to the top of the polymerization vessel. The polymerization exotherms in an insulated container to maximum temperature, at which time, it is placed in an oven set at 70° C. for 8 hours. The resulting tough gel is reduced to 1/8 inch gel worms, which are air dried for two hours at 65° C. and then reduced to 9–20 mesh powder. Solubility and solution viscosity are determined in the same way as in Example 1 and the results are set forth in Table 3, below.

TABLE 3

SOLUTION VISCOSITY AND SOLUBILITY OF 40:60
Q9:AMD COPOLYMER-GEL POLYMERIZATION

| Example | HYP ppm | MBA wppm | MBA mppm | S.V. mPa·s | CEQ % | CEQ(S) % | IR % |
|---|---|---|---|---|---|---|---|
| 12A\* | 0 | 5 | 3.9 | (i) | — | — | — |
| 12B\* | 0 | 25 | 19.5 | (i) | — | — | — |
| 12C\* | 75 | 25 | 19.5 | (i) | — | — | — |
| 12A | 100 | 5 | 3.9 | 2.83 | 84.6 | 87.7 | 1.2 |
| 12B | 100 | 10 | 7.8 | 2.88 | 87.0 | 92.5 | 1.1 |
| 12C | 100 | 25 | 19.5 | 2.98 | 86.8 | 89.8 | 1.1 |

\* = Control Sample
HYP = sodium hypophosphite
mppm = molar parts per million
(i) = insoluble Table 3 demonstrates that this invention can be used to prepare unsheared, soluble, highly branched, high molecular weight copolymers by gel polymerization and that any chain-transfer agent can be used so long as it is applied in optimum concentration.

EXAMPLES 13–17

Various copolymer products are tested as agents for releasing water from sewage sludge at several different dosage levels to determine optimum cake solids. Predetermined amounts of a 0.2% aqueous solution of the copolymers are mixed into 200 gms of sewage sludge in a 400 ml beaker using a three bladed eturbine stirrer for 3 minutes at 750 rpm. The flocculated sludge is allowed 3 minutes of free drainage in an 8 cm tube containing a piece of filter medium. Then, another piece of filter medium is placed on top of the sludge cake, and using a piston press, pressure is applied for a total of 6 minutes in accordance with the following schedule; 0.1 min. at 10 psi, 0.1–2 min. at 20 psi, 2–3 min. at 30 psi and 3–6 min. at 40 psi. The sludge cake is removed from the filter medium, weighed, dried for 16 hours at 95° C., reweighed and percentage cake solids determined. For comparison purposes, sheared polymers are also prepared and tested as agents for releasing water from sewage sludge. The sheared polymers are prepared by shearing a 0.1 weight percent solution of various unsheared polymers in a Silverson L2R mixer. The Silverson mixer is equipped with a square hole, high shear screen and 3 mm diameter impeller that is rotated at 3000 rpm for 15 minutes. A cooling bath is used to keep the shearing solution at about 22° C. during the 15 minute shearing period. This degree and method of shearing represents the typical shearing of the prior art as disclosed in EP 0201237 Column 11, lines 17–19. The results are set forth in Table 4, below.

TABLE 4

DEWATERING OF GREENWICH, CT 1°/2° SLUDGE

| | Example | | | | | | | | | |
|---|---|---|---|---|---|---|---|---|---|---|
| | 13A | 13B | 13C (S) | 14A | 14B | 14C (S) | 15A | 15B (S) | 16 (m)* | 17 (p)* |
| | Previous Example | | | | | | | | | |
| | 5B | 1B* | 1B* (S) | 5C | 1C* | 1C* (S) | 1F* | 1F* (S) | — | — |
| Material | | | | | | | | | | |
| AMD, % | 60 | 60 | 60 | 60 | 60 | 60 | 60 | 60 | — | — |
| Q-9, % | 40 | 40 | 40 | 40 | 40 | 40 | 40 | 40 | — | — |
| IPA, % | 1.5 | 0 | 0 | 1.5 | 0 | 0 | 0 | 0 | — | — |
| MBA, | | | | | | | | | | |
| wppm | 10 | 10 | 10 | 20 | 20 | 20 | 100 | 100 | — | — |
| mppm | 7.8 | 7.8 | 7.8 | 15.6 | 15.6 | 15.6 | 78.0 | 78.0 | — | — |
| Properties | | | | | | | | | | |
| S.V., mPa · s | 2.74 | 1.71 | — | 3.01 | 1.55 | — | 1.26 | — | — | — |
| S.V. (S), mPa · s | — | — | 1.70 | — | — | 1.62 | — | 1.31 | — | — |
| CEQ, % | 91.6 | 18.0 | — | 92.8 | 16.2 | — | 4.1 | — | — | — |
| CEQ (S), % | — | — | 19.6 | — | — | 14.5 | — | 39.0 | — | — |
| Cake Solids, % | | | | | | | | | | |
| 6.7, lb/ton | 28.6 | | | 27.9 | | | | | 23.2 | 20.0 |
| 7.8, lb/ton | 30.3 | | | 29.2 | | | | | 28.4 | 22.9 |
| 9.0, lb/ton | 30.6 | | | 30.3 | | | | | 28.4 | 31.0 |
| 10.1, lb/ton | 30.7 | A | A | 31.1 | A | A | | | 21.1 | 25.2 |
| 11.2, lb/ton | 29.0 | A | A | 27.9 | A | A | | | | |
| 15.6, lb/ton | | A | 27.4 | | A | 28.0 | | | | |
| 17.9, lb/ton | | 22.8 | 29.9 | | A | 29.0 | | | | |
| 20.1, lb/ton | | 25.7 | 29.7 | | A | 29.4 | | | | |
| 22.3, lb/ton | | 28.8 | 30.8 | | 21.8 | 32.0 | | | | |
| 24.6, lb/ton | | | | | — | 29.6 | | | | |
| 26.8, lb/ton | | | | | 28.8 | — | | | | |
| 31.3, lb/ton | | | | | 28.5 | | | | | |
| 35.7, lb/ton | | | | | 28.3 | | A | A | | |
| 120.7, lb/ton | | | | | | | 22.1 | 27.1 | | |
| 136.8, lb/ton | | | | | | | 27.1 | 29.0 | | |

(S) = sheared polymer
* = control sample; 16 (m) and 17 (p) represent state-of-the-art commercial cationic polyacrylamides
AMD = acrylamide
Q-9 = acryloxyethyltrimethylammonium chloride
IPA = isopropyl alcohol
MBA = methylene bisacrylamide
S.V. = solution viscosity
lb/ton = pounds of real polymer per ton of dry sludge
A = Did not form a cake.

Table 4 clearly shows that the polymers of this invention consistently give higher cake solids than other polymers of the prior art and perform at significantly lower dose levels than the sheared, insoluble branched polymers. Furthermore, while it was confirmed that although shearing improved performance of insoluble polymers, it is still substantially inferior to the unsheared copolymers of this invention. A further advantage of the copolymers of this invention is that high cake solids are obtained over a wide dose range.

EXAMPLES 18–21

The procedure of Example 13 is repeated using a different sludge material. In Examples 18 and 19 an alternative mixing method is used. Instead of using a three blade turbine stirrer, the polymer and sewage sludge are tumbled in a 1 quart jar for 3 minutes at 45 rpm. The cake solid percentage is determined and the results are set forth in Table 5, below.

TABLE 5

DEWATERING STAMFORD, CT 1°/2° SLUDGE-EFFECT OF MIXING

| Example | Previous Example | Mix | IPA % | MBA wppm | mppm | Cake Solids, % | | | | | |
|---|---|---|---|---|---|---|---|---|---|---|---|
| | | | | | | 6.2** | 8.2** | 12.4** | 16.4** | 24.6** | 32.8** |
| 18A | 5B | T | 1.5 | 10 | 7.8 | 23.9 | 24.4 | 25.5 | 25.1 | 25.4 | 23.8 |
| 18B | 1B* | T | 0 | 10 | 7.8 | A | 21.6 | 21.6 | — | 24.7 | 21.6 |
| 18C (s) | 1B* (S) | T | 0 | 10 | 7.8 | A | 22.0 | 24.1 | 23.6 | 24.1 | 22.8 |
| 19A | 5C | T | 1.5 | 20 | 15.6 | 22.9 | 24.9 | — | 24.6 | 26.5 | 26.3 |
| 19B | 1C* | T | 0 | 20 | 15.6 | | A | — | 20.0 | 24.6 | 22.8 |
| 19C (s) | 1C* (S) | T | 0 | 20 | 15.6 | | A | — | 21.9 | 24.4 | 21.6 |
| 20A | 5B | Tr | 1.5 | 10 | 7.8 | | 24.5 | 25.7 | 27.4 | 25.8 | 27.6 |
| 20B | 1B* | Tr | 0 | 10 | 7.8 | | A | 24.9 | 24.4 | 25.6 | 19.5 |
| 20C (s) | 1B* (S) | Tr | 0 | 10 | 7.8 | | A | 24.3 | 23.6 | 25.3 | 21.9 |
| 21A | 5C | Tr | 1.5 | 20 | 15.6 | | 24.9 | 25.8 | 28.2 | 24.7 | 25.4 |
| 21B | 1C* | Tr | 0 | 20 | 15.6 | | A | 21.5 | 23.3 | 25.2 | 24.9 |
| 21C (s) | 1C* (S) | Tr | 0 | 20 | 15.6 | | A | 23.4 | 23.7 | 25.1 | 24.0 |

\* = Control Sample
\*\* = Dose in pounds of real polymer per ton of dry sludge
T = Tumble mix method
Tr = Turbine blade mix method
A = Did not form a cake Again, polymers of this invention outperform insoluble branched polymers and sheared polymers and perform at lower dose levels. The method of mixing can be seen to have no significant effect on the performance of this invention's polymer flocculant product.

EXAMPLES 22 AND 23

The procedure of Example 13 is repeated varying the level of cationicity and using two sludge types. The results are set forth in Table 6, below.

EXAMPLES 24–30

The procedure of Example 13 is repeated, varying the concentration and type of branching agent. The results are set forth in Table 7, below.

TABLE 6

1°/2° SLUDGE DEWATERING - EFFECT OF CATIONICITY

| Example | Previous Example | IPA % | MBA wppm | mppm | Q-9 Mole % | SLUDGE | Cake Solids % | | | |
|---|---|---|---|---|---|---|---|---|---|---|
| | | | | | | | 11.11** | 16.67** | 22.22** | 33.33** |
| 22A | 8B | 1.5 | 25 | 15.5 | 20 | St | 21.4 | 21.2 | 22.3 | 22.0 |
| 22B | 8B* | 0 | 25 | 15.5 | 20 | St | A | — | 21.0 | 21.7 |
| 22C | 8B* (S) | 0 | 25 | 15.5 | 20 | St | A | — | 22.1 | 23.3 |

| Example | Previous Example | IPA % | MBA wppm | mppm | Q-9 Mole % | SLUDGE | Cake Solids % | | | | | | | |
|---|---|---|---|---|---|---|---|---|---|---|---|---|---|---|
| | | | | | | | 6.3** | 7.4** | 8.4** | 9.5** | 10.5** | 12.0** | 21.0** | 25.2** | 29.4** |
| 23A | 9A | 1.5 | 10 | 9.4 | 60 | G | 27.2 | 29.8 | 30.0 | 31.0 | 30.8 | | | | |
| 23B | 9A* | 0 | 10 | 9.4 | 60 | G | | | | | | | A | 28.8 | 26.8 | 25.6 |
| 23 (S) | 9A* (S) | 0 | 10 | 9.4 | 60 | G | | | | | | | A | — | 27.8 | 30.0 |

\* = Control Sample
\*\* = Dose in pounds of real polymer per ton of dry sludge
St = Stamford, CT
G = Greenwich, CT
A = Did not form cake.
(S) = Sheared The unsheared, branched, soluble copolymer of this invention outperforms both the insoluble and the sheared, branched copolymers producing higher percentages of cake solids at lower dose levels.

TABLE 7

STAMFORD, CT SLUDGE 1°/2° DEWATERING - EFFECT OF BRANCHING AGENT

| Examples | Previous Example | IPA % | Branching Agent WT. ppm | Branching Agent MOLAR ppm | Type | Cake Solids, % 6.4** | 8.6** | 10.8** | 12.9** | 15.1** | 17.2** | 21.5** | 25.8** | 30.2** |
|---|---|---|---|---|---|---|---|---|---|---|---|---|---|---|
| 24* | 2A* | 0.125 | 20 | 15.6 | MBA | | | | 24.4 | — | — | 27.2 | 28.1 | 25.0 |
| 25* | 2B* | 0.25 | 20 | 15.6 | MBA | | 25.5 | — | 27.0 | | | 27.1 | | |
| 26 | 5C | 1.5 | 20 | 15.6 | MBA | 27.7 | 29.6 | 29.5 | 28.8 | 27.5 | — | | | |
| 27 | 4C | 1.0 | 15 | 11.7 | MBA | 26.1 | 28.1 | 29.6 | 31.1 | 28.0 | 27.4 | | | |
| 28 | 4B | 1.0 | 10 | 7.8 | MBA | 28.6 | 28.8 | 27.8 | 27.8 | 27.9 | 26.5 | | | |
| 29 | 10 | 1.5 | 49.4 | 7.8 | PEGDMA | | 28.5 | 30.4 | 27.9 | 29.8 | 28.8 | | | |
| 30 | 11 | 1.5 | 123.4 | 19.5 | PEGDMA | | 27.0 | — | 29.9 | — | 29.2 | 29.2 | 28.0 | |

\* = Comparative Example
\*\* = Dose in pounds of real polymer per ton of dry sludge
MBA = methylenebisacrylamide
PEGDMA = polyethyleneglycol dimethacrylate Improved dewatering results of this invention are once again easily seen from Table 7, above, when an alternative branching agent is used, producing higher cake solids at lower dose levels.

EXAMPLES 31–35

The procedure of Example 13 is repeated using a variety of IPA and MBA concentrations. The results are set forth below in Table 8, below.

TABLE 8

STAMFORD, CT 1°/2° SLUDGE DEWATERING

| Example | Previous Example | IPA % | MBA wppm | MBA mppm | Cake Solids, % 12.2* | 15.2* | 18.3* | 21.3* | 24.4* | 27.4* | 30.5* | 36.6* | 42.7* | 48.8* | 62.0* |
|---|---|---|---|---|---|---|---|---|---|---|---|---|---|---|---|
| 31A | 3B | 0.5 | 10 | 7.8 | A | | 31.7 | 32.8 | 32.9 | | | | | | |
| 31B | 3C | 0.5 | 15 | 11.7 | A | | 31.7 | — | 34.4 | 34.1 | 35.4 | | | | |
| 31C | 3D | 0.5 | 25 | 19.5 | | A | — | 33.9 | 32.2 | 32.1 | | | | | |
| 32A | 4A | 1.0 | 5 | 3.9 | A | — | 31.2 | 33.0 | 31.0 | — | 29.6 | | | | |
| 32B | 4B | 1.0 | 10 | 7.8 | A | — | 31.6 | 33.2 | 30.4 | | | | | | |
| 32C | 4C | 1.0 | 15 | 11.7 | | | — | A | 32.5 | 33.2 | 34.8 | 34.9 | 33.3 | | |
| 32D | 4D | 1.0 | 25 | 19.5 | | | | 30.8 | — | 34.9 | 32.6 | 32.7 | | | |
| 33 | 5B | 1.5 | 10 | 7.8 | 31.9 | 31.3 | 32.3 | 32.3 | 31.3 | | | | | | |
| 34A | 6B | 2.0 | 10 | 7.8 | | | | 30.8 | — | 31.6 | | | | | |
| 34B | 6D | 2.0 | 15 | 11.7 | 29.1 | — | 30.0 | — | 29.1 | 29.7 | | | | | |
| 34C | 6C | 2.0 | 25 | 19.5 | 28.9 | — | 31.2 | — | 29.8 | 29.5 | | | | | |
| 34D | 6E | 2.0 | 50 | 39.0 | A | — | 29.8 | — | 27.3 | 26.5 | | | | | |
| | | | | | 17.8* | 22.3* | 26.7* | 31.2* | 35.6* | 44.5* | | | | | |
| 35A | 7A | 4.0 | 25 | 19.5 | 29.0 | 30.1 | 32.8 | 30.4 | | | | | | | |
| 35B | 7B | 4.0 | 50 | 39.0 | 30.9 | — | 31.4 | 31.8 | 32.0 | | | | | | |
| 35C | 7C | 4.0 | 100 | 78.0 | A | 29.2 | 30.8 | 33.8 | 34.5 | 32.7 | | | | | |

\* = Dose in pounds of real polymer per ton of dry sludge
A = Did not form a cake Table 8, above, further shows that higher cakes solids and superior dewatering are obtained with a range of unsheared, soluble, branched copolymers prepared with IPA and MBA.

EXAMPLE 36

The lowest molecular weight copolymer of this invention is analyzed for bulk viscosity at low concentration for comparison with low molecular weight branched copolymers of Pech, Fr 2,589,145. The results are set forth in Table 9, below.

TABLE 9

BULK VISCOSITY OF COPOLYMER EXAMPLE 7C

| Example | Previous Example | Q-9 Mole % | IPA % | MBA wppm | MBA mppm | Polymer Conc. % | Bulk viscosity[1] mPa · s |
|---|---|---|---|---|---|---|---|
| 36A | 7C | 40 | 4.0 | 100 | 78.0 | 1.00 | 1,168 |
| 36B | 7C | 40 | 4.0 | 100 | 78.0 | 1.66 | 2,240 |
| 36C | 7C | 40 | 4.0 | 100 | 78.0 | 2.32 | 5,570 |

[1]Brookfield viscometer (#2 spindle), 30 RPM, 25° C.

The polymers of this invention are of much higher molecular weight than those disclosed in Pech. The polymers disclosed in Pech had viscosities of 2200 to 3600 mPa•s at a concentration of 20 weight percent. Polymers of this invention have a viscosity of 5,570 mPa•s at a significantly lower concentration of only 2.3 weight percent, i.e. they are of much higher molecular weights.

EXAMPLE 37

The procedure of Example 1 is repeated to produce sheared and unsheared polymeric flocculants possessing substantially the same solubility and viscosity characteristics for comparison purposes. The sheared polymer solution, 37B*, is produced by shearing for 60 minutes at 5000 rpm with a Silverson homogenizer. Dewatering is carried out using a tumble mixing method of Greenwich, Conn. 1½° sludge. Polymer solution characteristics and dewatering application results are set forth in Table 10, below.

easily from the press material leaving it clean with no residual particles of sludge.

It can be seen from Table 10 that, while a sheared polymer possessing substantially the same viscosity and solubility characteristics as a polymer of this invention produced similar cake solid percentages at equivalent dose levels, the yield of sludge and the cake quality are inferior. High dry sludge yield is desirable for economy, and non-sticky easily removed cakes are desirable for ease of filter cleaning and thus long filter life. Both Examples 37A and 37B represent polymers possessing similar solution viscosity values as the sheared polymer, 37B*, with 37A having a slightly lower CEQ% and 37B having a slightly higher CEQ%. It can also be seen that shearing does not cause a substantial increase in polymer viscosity. Example 37B* is sheared at a rate of 5000 rpm for about 1 hour; this represents the conventional manner of application of the prior art. As previously mentioned, this expensive and time consuming practice is unnecessary for the application of polymeric flocculants of this invention which are produced in ready-to-use form.

TABLE 10

PROPERTIES AND SLUDGE DEWATERING CHARACTERISTICS OF SHEARED AND UNSHEARED 40:60 Q-9:AMD COPOLYMERS

| Example | Previous Example | IPA % | MBA wppm | MBA mppm | S.V. mPa · s | CEQ % | Dose** lb/ton | Cake Solids % | Yield % | Cake Rating |
|---|---|---|---|---|---|---|---|---|---|---|
| 37A* | 1B* | 0 | 10 | 7.8 | 1.71 | 16.0 | 31.9 | A | A | — |
|  |  |  |  |  |  |  | 39.8 | 24.6 | 93.6 | 2 |
|  |  |  |  |  |  |  | 47.8 | 23.1 | 90.6 | 2 |
| 37B* | 1B* (S) | 0 | 10 | 7.8 | 1.88 | 45.8 | 27.9 | 25.2 | 84.9 | 4 |
|  |  |  |  |  |  |  | 31.9 | 24.5 | 96.2 | 2 |
|  |  |  |  |  |  |  | 35.8 | 26.3 | 88.0 | 4 |
| 37A | 3D | 0.5 | 25 | 19.5 | 1.80 | 30.6 | 27.9 | 24.2 | 92.2 | 2 |
|  |  |  |  |  |  |  | 31.9 | 23.8 | 91.2 | 2 |
|  |  |  |  |  |  |  | 35.8 | 25.6 | 98.4 | 1 |
| 37B | 7C | 4.0 | 100 | 78.0 | 1.92 | 54.0 | 27.9 | 24.4 | 96.2 | 2 |
|  |  |  |  |  |  |  | 31.9 | 26.4 | 99.0 | 0 |
|  |  |  |  |  |  |  | 35.8 | 24.7 | 95.2 | 3 |

IPA = isopropyl alcohol, chain-transfer agent
MBA = methylenebisacrylamide, branching agent
** = pounds of real polymer per ton of dry sludge
A = Did not form a cake.
Q-9 = acryloxyethyltrimethylammonium chloride
S.V. = solution viscosity
wppm = weight parts per million
* = control sample
mppm = molar parts per million The yield, in Table 10, is a measure of the yield of dry sludge after the belt press procedure has been completed. The cake rating is a qualitative description of the physical properties of the cake where a rating of 5 is the worst case, the cake being very sticky and difficult to remove from the filter press medium, thus resulting in a dirty filter. A rating of 0 represents the best case, where the cake releases very

EXAMPLES 38–40

Branched homopolymers of acrylamide are prepared in the presence of a chain-transfer agent by the emulsion polymerization procedure described in Example 1. For comparison purposes sheared and unsheared branched homopolymers of acrylamide without the addition of a chain-transfer agent are also prepared. Shearing is performed for 15 minutes at 3000 rpm. The polymers are then tested as flocculants in a silica settling application. The silica settling procedure comprises treating an aqueous mixture of 150 gms of silica (–200 mesh) dispersed in one litre of water with 0.027 lbs/ton of polymer. The results and compositional information are set forth below in Table 11.

TABLE 11

FLOCCULATION OF SILICA WITH HOMOPOLYACRYLAMIDE

| Example | IPA % | MBA wppm | MBA mppm | S.V. mPa · s | Settling Rate cm/sec |
|---|---|---|---|---|---|
| 38 | 1.0 | 7.5 | 3.5 | 3.28 | 0.618 |
| 38A* | 0 | 7.5 | 3.5 | 1.85 | 0.452 |
| 38A(S)* | 0 | 7.5 | 3.5 | 1.66 | N.F. |
| 39 | 1.0 | 15 | 7.0 | 2.88 | 0.511 |
| 39A* | 0 | 15 | 7.0 | 1.55 | 0.382 |
| 39A(S)* | 0 | 15 | 7.0 | 1.51 | N.F. |
| 40 | 1.0 | 25 | 11.5 | 2.02 | 0.470 |
| 40A* | 0 | 25 | 11.5 | 1.29 | N.F. |
| 40A(S)* | 0 | 25 | 11.5 | 1.28 | N.F. |

* = Control Sample
(S) = Sheared Polymer
S.V. = Solution Viscosity
IPA = Isopropyl alcohol
MBA = Methylenebisacrylamide
N.F. = No floc formed.

As can clearly be seen from Table 11, above, the unsheared homopolyacrylamide of the present invention possesses characteristics as defined in the appended claims and outperforms homopolyacrylamides prepared without any chain-transfer agent. Note that sheared homopolyacrylamides are not useful in silica flocculation applications.

EXAMPLES 41–43

Various branched cationic acrylamide copolymers are prepared in the presence of chain-transfer agent by the emulsion polymerization procedure described in Example 1. For comparison purposes, cationic acrylamide copolymers are also prepared without chain-transfer agent. The results are set forth in Table 12, below.

TABLE 12

PREPARATION OF BRANCHED CATIONIC COPOLYMERS

| Example | Cationic Monomer | Mole % | IPA % | MBA wppm | MBA wppm | S.V. mPa · s |
|---|---|---|---|---|---|---|
| 41 | A | 40 | 1.5 | 25 | 25.4 | 2.10 |
| 41* | A | 40 | 0 | 25 | 25.4 | 1.80 |
| 42 | B | 10 | 1.5 | 25 | 14.2 | 2.24 |
| 42* | B | 10 | 0 | 25 | 14.2 | 1.45 |
| 43 | C | 10 | 1.5 | 25 | 13.0 | 2.17 |
| 43* | C | 10 | 0 | 25 | 13.0 | 1.50 |

* = Control Sample
A = methacryloxytrimethylammonium methosulfate
B = methacrylamidopropyltrimethylammonium chloride
C = diallyldimethylammonium chloride As can be seen from Table 12, above, other cationic copolymers having characteristics defined in the appended claims are formed.

EXAMPLE 44

A branched cationic homopolymer of dimethylaminoethylacrylate methyl chloride salt is prepared in the presence of chain-transfer agent by the emulsion polymerization procedure described in Example 1. For comparison purposes, sheared and unsheared branched homopolymers of acryloxyethyltrimethylammonium chloride (Q-9) without the addition of any chain-transfer agent are also prepared. Shearing is performed for 15 minutes at 3000 rpm. Sludge dewatering tests, as defined above, are performed and the results along with compositional data are set forth below in Table 13, below.

TABLE 13

DEWATERING OF GREENWICH, CT 1°/2° SEWAGE SLUDGE-Q9 HOMOPOLYMERS

| Example | IPA % | MBA wppm | MBA mppm | S.V. mPa · s | CEQ % | Dose lb/ton | Yield % | Cake Solids % |
|---|---|---|---|---|---|---|---|---|
| 44 | 1.0 | 35 | 44.1 | 2.00 | 39.1 | 21.9 | 84.3 | 21.8 |
|  |  |  |  |  |  | 25.5 | 89.0 | 23.6 |
|  |  |  |  |  |  | 29.2 | 98.0 | 24.0 |
|  |  |  |  |  |  | 32.8 | 93.2 | 23.2 |
| 44* | 0 | 25 | 31.5 | 1.84 | 26.5 | 21.9 | A | A |
|  |  |  |  |  |  | 25.5 | A | A |
|  |  |  |  |  |  | 29.2 | 81.0 | 22.2 |
|  |  |  |  |  |  | 32.8 | 89.7 | 23.5 |
| 44(S)* | 0 | 25 | 31.5 | — | — | 21.9 | 85.9 | 22.6 |
|  |  |  |  |  |  | 25.5 | 86.1 | 22.1 |
|  |  |  |  |  |  | 29.2 | 81.6 | 24.4 |
|  |  |  |  |  |  | 32.8 | 95.2 | 21.9 |

* = Control Sample
lb/ton = pounds of real polymer per ton of dry sewage sludge
A = Did not form a cake solid.
(S) = Sheared polymer Table 13, above, demonstrates that cationic homopolymers of Q-9 possess characteristics as defined in the appended claims and exhibit better overall flocculating capabilities than sheared and unsheared Q-9 homopolymers prepared without the addition of chain-transfer agent.

EXAMPLES 45–47

Again following the procedure of Example 44, homopolymers are prepared from 45) methacryloxytrimethylammonium chloride; 46) methacrylamidopropyltrimethylammonium methosulfate and 47) diallyldimethylammonium chloride. Similar, high molecular weight, branched, water-soluble polymers are recovered.

EXAMPLES 48–51

Following the procedure of Example 28, non-ionic, branched, water-soluble, high molecular weight homopolymers are prepared from 48) N-methylacrylamide; 49) N,N-dimethylacrylamide; 50) N-vinylpyrrolidone and 51) N-vinylmethylacetamide. In each instance, excellent polymers result.

EXAMPLES 52–55

Again following the procedure of Example 1 except that the acrylamide is replaced by 52) N-methylacrylamide; 53) N-vinylmethylformamide, similar copolymers are produced.

The above mentioned patents and publications are incorporated herein by reference.

Many variations of the present invention will suggest themselves to those skilled in this art in light of the above detailed description. For example, instead of using methylenebisacrylamide as a branching agent, any polyfunctional monomer compound may be used, including glycidyl acrylate; dialdehydes, such as glyoxal, and the like. A number of chain-transfer agents may be used instead of isopropyl alcohol, such as sodium hypophosphite; mercaptans; sulfites, and the like.

Monomers may include any ethylenically unsaturated acrylic or vinyl monomers. Other useful monomers may comprise sodium acrylate; 2-acrylamidomethylpropane sulfonate; vinyl acetate, and the like. Also contemplated are all methods of polymerization and dewatering processes.

All such obvious modifications are within the full intended scope of the appended claims.

EXAMPLE 56

Preparation of a High Molecular Weight, Branched, Soluble Dimethylaminomethylpolyacrylamide and its Quaternized Derivative To 378 parts of the backbone polyacrylamide from Example 39 is added a mixture of low odor paraffin solvent (106 parts) and sorbitan monooleate (9 parts). A preformed mixture of 60% aqueous dimethylamine (39) parts and 37% aqueous formaldehyde is then added with mixing over ½ hour keeping the temperature below 30° C. The reaction is then completed by heating for 204 hours at 40° C. Then, 5.2% quanidine nitrate (30) parts) is added to give the dimethylaminomethylated polyacrylamide with 22.7% polymer solids and a CEQ of over 30%.

In a pressurized reactor, methyl chloride (54 parts) is added over 2 hours to 238 parts of the dimethylaminomethylated polyacrylamide prepared above. This mixture is then heated to 38° C. for 3 hours to ensure complete quaternization. The resultant quaternized dimethylaminomethylated polyacrylamide has a CEQ of over 30%.

Both high molecular weight, highly branched, soluble, quaternized and unquaternized dimethylaminomethylated polyacrylamides are effective flocculants and dewatering aids.

We claim:

1. A method of releasing water from a dispersion of suspended solids which comprises (a) adding to the dispersion, as a true solution, from about 0.1 to about 50,000 parts per million of dispersion solids of an unsheared, branched, water-soluble, cationic, polymeric flocculant, said polymeric flocculant having a solution viscosity of at least about 1.8 mPa•s measured in a Brookfield viscometer with a UL adapter at 25° C. on a 0.1 percent, by weight, polymer solution in 1M NaCl at 60 rpm, a solubility quotient of greater than about 30 percent, and a branching agent content of from about 4 to about 80 molar parts per million based on initial monomer content, and (b) dewatering the mixture of the dispersion of suspended solids and the polymeric flocculant.

2. A method as defined in claim 1 wherein the polymeric flocculant has a solubility quotient of greater than about 40 percent.

3. A method as defined in claim 1 wherein the polymeric flocculant has a branching agent content of from about 8 to about 20 molar parts per million based on original monomer content.

4. A method as defined in claim 1 wherein the polymeric flocculant has a solution viscosity of at least about 2.0 mPa•s measured in a Brookfield viscometer with a UL adapter at 25° C. on a 0.1 percent, by weight, polymer solution in 1M NaCl at 60 rpm.

5. A method as defined in claim 4 wherein said solution viscosity is at least about 2.2 mPa•s.

6. A method as defined in claim 5 wherein said solution viscosity is at least about 2.4 mPa•s.

7. A method as defined in claim 1 wherein said polymeric flocculant is a polymer formed from one or more ethylenically unsaturated monomers selected from acrylamide; methacrylamides; N-alkylacrylamides, N,N-dialkylacrylamides; N-vinyl methylacetamide; N-vinyl methyl formamide; vinyl acetate; N-vinyl pyrrolidone; N,N-dialkylaminoalkylacrylates or methacrylates and their quaternary or acid salts; N,N-dialkylaminoalkyl-acrylamides and methacrylamides and their quaternary or acid salts or diallyl dimethylammonium acid salts.

8. A method as defined in claim 7 wherein said polymeric flocculant is a polymer formed from one or more ethylenically unsaturated monomers selected from acrylamide; N,N-dialkylaminoalkylacrylates and methacrylates and their quaternary or acid salts, or diallyl dimethylammonium acid salts.

9. A method as defined in claim 8 wherein said polymeric flocculant is a polymer formed from acrylamide in combination with at least one cationic monomer.

10. A method as defined in claim 9 wherein said polymeric flocculant is a polymer formed from acrylamide and acryloxyethyltrimethylammonium chloride.

* * * * *